United States Patent
Linger et al.

(10) Patent No.: US 8,899,633 B2
(45) Date of Patent: Dec. 2, 2014

(54) LOCK DEVICE

(75) Inventors: Mats Linger, Onsala (SE);
Lars-Magnus Felth, Kungsbacka (SE);
Ingvar Gillholm, Kungsbacka (SE);
Mattias Bokesand, Tostared (SE);
Martin Bredberg, Gunnilse (SE)

(73) Assignee: ABB AB, Vasteras (SE)

( * ) Notice: Subject to any disclaimer, the term of this patent is extended or adjusted under 35 U.S.C. 154(b) by 376 days.

(21) Appl. No.: 12/905,391

(22) Filed: Oct. 15, 2010

(65) Prior Publication Data

US 2011/0083480 A1   Apr. 14, 2011

Related U.S. Application Data

(63) Continuation of application No. PCT/SE2009/050393, filed on Apr. 16, 2009.

(30) Foreign Application Priority Data

Apr. 16, 2008   (SE) ........................................ 0800873

(51) Int. Cl.
*E05C 1/06*   (2006.01)

(52) U.S. Cl.
USPC ........................... 292/143; 292/159; 292/169

(58) Field of Classification Search
USPC .......................... 292/143, 137, 159, 170, 169
See application file for complete search history.

(56) References Cited

U.S. PATENT DOCUMENTS

| | | | | |
|---|---|---|---|---|
| 4,902,053 | A * | 2/1990 | Hakkarainen et al. | 292/144 |
| 5,878,612 | A | 3/1999 | Mauer | |
| 6,283,514 | B1 | 9/2001 | Letzel | |
| 6,733,050 | B1 * | 5/2004 | Yao | 292/169 |
| 2005/0151380 | A1 * | 7/2005 | Kondratuk | 292/201 |
| 2009/0113951 | A1 * | 5/2009 | Geiger | 70/57 |

FOREIGN PATENT DOCUMENTS

| | | |
|---|---|---|
| DE | 196 32 962 A1 | 2/1998 |
| EP | 0 819 813 A2 | 1/1998 |
| EP | 0 825 628 A1 | 2/1998 |
| WO | WO 98/31903 A1 | 7/1998 |

OTHER PUBLICATIONS

International Search Report (PCT/ISA/210) issued on Jul. 1, 2009, by Swedish Patent Office as the International Searching Authority for International Application No. PCT/SE2009/050393.

Written Opinion (PCT/ISA/237) issued on Jul. 1, 2009, by Swedish Patent Office as the International Searching Authority for International Application No. PCT/SE2009/050393.

* cited by examiner

*Primary Examiner* — Mark Williams
(74) *Attorney, Agent, or Firm* — Buchanan Ingersoll & Rooney PC (57) ABSTRACT

The present disclosure relates to a lock device, such as for safety functions, which includes a displaceable lock bolt, which can cooperate with a receiver in order to provide a locked position and unlocked position. The lock bolt includes a guide portion in a second lock bolt portion which, in response to a guiding device applying a force to the lock bolt, guides the lock bolt from the unlocked position to the locked position. The guiding device, in the locked position, is prevented from displacing the lock bolt to the unlocked position. The lock bolt is arranged to be displaced from the locked position to the unlocked position through influence of an external force applied to a first lock bolt portion.

28 Claims, 12 Drawing Sheets

LOCK DEVICE

RELATED APPLICATIONS

This application claims priority as a continuation application under 35 U.S.C. §120 to PCT/SE2009/050393, which was filed as an International Application on Apr. 16, 2009 designating the U.S., and which claims priority to Swedish Application 0800873-2 filed in Sweden on Apr. 16, 2008. The entire contents of these applications are hereby incorporated by reference in their entireties.

FIELD

The present disclosure relates to a lock device for locking and unlocking, such as a lock device having a plurality of positions at locking/unlocking. Such a lock device can, for example, provide safety functions, and include a displaceable lock bolt which can cooperate with a receiver in order to provide locked and unlocked positions.

BACKGROUND INFORMATION

It is desirable to control the safety of, for example, hazardous machines in a workshop environment. For machine safety, it is desirable that locks except for manual operability also can be remote-controlled (electrical operability) and monitored. In these cases, the lock device should be kept locked from the outside during the time when, for example, a hazardous machine in the locked area is running, at the same time as the lock device can be opened from the inside.

Certain kinds of lock devices involve adaptation for industrial applications and to manage rough environments. In safety applications, such as gates surrounding hazardous machines, such a device should keep a door locked even at energy drop-out (that is, energy should be applied in order to unlock the door).

DE 196 32 962 refers to a switch and a door system. The system includes two handles, an inner and an outer handle, which are coupled together through a pin, and an elongated key-like actuator. The system further includes a gear rack section provided with a gear drive section cooperating with the pin in a longitudinal direction of the housing in communication with the actuator.

SUMMARY

A lock device is disclosed comprising: a displaceable lock bolt; and a receiver configured for cooperating with the lock bolt to provide locked and unlocked positions, wherein the lock bolt includes: a guide portion for guiding said lock bolt from the unlocked position to the locked position; and a guiding means for applying a force to the lock bolt, said guiding means in the locked position being prevented from displacing the lock bolt to the unlocked position, the lock bolt being displaceable from the locked position to the unlocked position when an external force is applied to a first lock bolt portion.

A lock bolt for a lock device is disclosed, wherein said lock bolt comprises: a first lock bolt portion for locking the lock bolt; and a second lock bolt portion for guiding the lock bolt, the lock bolt including: a guide portion for receiving an applied force for guiding said lock bolt from an unlocked position to a locked position, wherein the lock bolt in the locked position is prevented from displacement to the unlocked position, and wherein the lock bolt is displaceable from the locked position to the unlocked position by an external force applied to a first lock bolt portion.

A safety area provided with a delimitation is disclosed, which delimitation comprises: an openable part; a lock device for the openable part, the lock device including: a guide portion for guiding said lock bolt from an unlocked portion to a locked position; and a guiding means for applying a force to the lock bolt, said guiding means in the locked position being prevented from displacing the lock bolt to the unlocked position, the lock bolt being displaceable from the locked position to the unlocked position when an external force is applied to a first lock bolt position, wherein the receiver is arranged on the delimitation, and said lock device keeps the openable part locked during operation of a machine which is arranged to stop upon opening of said openable part from inside the safety area.

A method is disclosed for locking and unlocking of a lock device having a displaceable lock bolt and a receiver configured for cooperating with the lock bolt to provide locked and unlocked positions, wherein the lock bolt includes a guide portion for guiding said lock bolt from the unlocked portion to the locked position, and a guiding means for applying a force to the lock bolt, said guiding means in the locked position being prevented from displacing the lock bolt to the unlocked position, the lock bolt being displaceable from the locked position to the unlocked position when an external force is applied to a first lock bolt position, the method comprising: setting said lock device in a first locked position by actuating a first handle; and setting said lock device in a second unlocked position by applying an external force to the lock bolt, which force comprises an influence from a second handle different from the first handle, or an external unit different from the first or second handle.

BRIEF DESCRIPTION OF THE DRAWINGS

In the following the disclosure is described with reference to a number of exemplary embodiments, of which.

DETAILED DESCRIPTION

A lock device is disclosed for primarily, but not exclusively, safety applications, wherein an exemplary embodiment, a door is kept locked when a clear signal for hazardous functions inside an area provided with a door has been given. An exemplary lock device includes parts and fulfills functions such as:

- built-in safety sensors having electrically operable locking with two positions (e.g., unlocked and locked)
- which works as an ordinary door lock as long as a handle has been turned to a reset position (e.g., when hazardous function can be allowed on the other side)
- three positions: one position for opening, one for closed door and one position for reset position (e.g., when a hazardous function can be allowed on the other side of the door)
- built-in sensors showing that the door is closed respectively in a reset position
- mechanical indication of a reset position
- emergency opening from the inside (e.g., a handle which can only open the door from the inside, where the handle is not able to reset the safety
- a sensor on the handle portion can be controlled by a bi-stable spring function (e.g., with a handle in a reset position so that a bolt is spring-biased using a sensor out towards a sensor mounted in or on the door frame, and with a handle in not-reset position with the bolt with the sensor is spring-biased in opposite direction.

As disclosed herein, an exemplary lock bolt comprises a portion configured to, via a guiding means for applying a force to the lock bolt, guide the lock bolt from an unlocked position to a locked position, whereby the guiding means in the locked position is prevented from displacing the lock bolt to the unlocked position. The lock bolt can be arranged to be displaced from the locked position to the unlocked position through the influence of an external force applied to a first lock bolt portion.

In an exemplary embodiment, the lock bolt includes a first lock bolt portion for locking and a second lock bolt portion for guiding of the lock bolt in a guiding groove. The guiding groove has a first portion for allowing the guiding means to be moved essentially freely and to displace the lock bolt, and a second portion, in which the guiding means is fixed, and prevents the lock bolt from being displaced. The guiding unit is arranged to displace the lock bolt and remove the guiding means from its locked position, in which the guiding means can be essentially freely moved.

An exemplary device can include a housing and a handle. According to a second exemplary embodiment, the second portion includes the guiding groove and a second guiding groove. For example, the first portion of said groove is essentially formed as an arc and the second portion of the groove is essentially straight, and runs essentially parallel to the first portion.

In an exemplary embodiment, the lock bolt includes a sensor. For example, the lock bolt is resiliently attached to the housing by means of a bi-stable spring or other suitable resilient attachment. For closing but not locking, the device can further include at least a second lock bolt connected to a movable part. For example, the device can further include a first lever connectable to the handle, and having the guiding means. The lock device can further include a second lever connectable to a second handle at an opposite side of the first handle. The second lever can be arranged to guide the lock bolt and the movable part. The lever may include a connection part to the handle in one end around which the lever can rotate, and a first guiding pin running in the groove in order to influence the bolt and a second guiding pin guiding the movable part.

An exemplary receiver can include a drive unit, a guiding part, and a sensor. The drive unit may be a motor arranged to drive the guiding part and drive the lock bolt. A sensor is arranged to sense and give a signal regarding the position of the lock bolt. The signal may be connected to a control unit for steering other units.

According to a second exemplary embodiment, the guiding means is a gear wheel and/or a motor.

In an exemplary embodiment, the lock housing may include a means for correct positioning of the housing which may be an extension provided with one or more holes, which are arranged to cooperate with a means arranged on the receiver. This can facilitate that the lock bolts are guided into the receiver in a correct way and secure closing and locking can arise.

In an exemplary embodiment, the movement of the lock bolt from an unlocked position to a locked position only is allowed when the lever with its rotational axis is in a locked position, wherein the lever includes an oval portion, which in the locked position of the bolt is located in an enlargement of the groove in the lock bolt. The turning of the axis by the lock bolt and release by itself can be prevented by the lock bolt being in its completely unlocked position to allow the pin to leave the groove.

According to an exemplary embodiment, the lock bolt is arranged to only be actuated from its unlocked position to its locked position on a condition that the second bolt is in a balanced central position at the same time as the relative position of the receiver and the lock are controlled. The second bolt is arranged to be locked in a central position with guaranteed engagement in the receiver, when the lock bolt is located in its locked position. The lock bolt may be arranged to only be actuated from its unlocked position to its locked position by means of the guiding pin if the bolt has engagement in the receiver, which is achieved with a depression in the groove where the guiding pin can engage in a position, in which the lock bolt is allowed to move out, on the condition that the second bolt is in a balanced central position and the guiding of the positions of the receiver and the lock in relation to each other occurs by a hole image in that extension from the lock, which overlaps the receiver.

The disclosure further relates to a lock bolt, for use in a lock device. The lock bolt can include a first lock bolt portion for locking, and a second lock bolt portion for guiding of the lock bolt. The lock bolt can include a part in the second lock bolt portion formed to have a force being applied for guiding the lock bolt from an unlocked position to the locked position, wherein the lock bolt in the locked position is prevented from displacing to the unlocked position. The lock bolt can be arranged to be displaced from the locked position to the unlocked position by an influence of an external force applied to the first lock bolt portion.

The disclosure further relates to a safety area provided with a delimitation, which delimitation includes an openable part, which is provided with a lock device and a receiver arranged on the delimitation, wherein within the area is arranged a machine. The lock device can be arranged to keep the openable part locked during operation of the machine, and the machine can be arranged to be stopped at opening of the openable part from the inside of the safety area.

The disclosure further relates to a method for locking and unlocking of a lock device. The method can include setting the lock device in a first locked position by actuating it with a first handle, setting said lock device in a second unlocked position by applying an external force to the lock bolt, which force has an influence from a second handle different from the first handle or an external unit different from the first or second handle. The lock device may also adopt a third position, wherein the lock device is in a closed but not locked position. The lock device may also adopt a fourth position, wherein the lock device is in an open position.

Thus, the disclosure relates to a lock device, such as a lock device for safety applications, where for example, a door is kept locked when a clear signal for hazardous functions inside the door has been given. The lock device can have a built-in safety sensor having an electrically operable locking with two positions (e.g., unlocked and locked). The lock device can work as an ordinary door lock as long as a handle is in a reset position (e.g., when the hazardous function can be allowed on the other side of the door). The lock device can have four exemplary positions: one position for opening, one for closed door, one position for reset position and one position for reset and locked position (e.g., when a hazardous function can be allowed on the other side of the door). The lock device can have built-in sensors showing that the door is reset respectively in a locked position. A reset position can be mechanically indicated. The lock device may be provided with an emergency opening from inside (e.g., a handle which can only open the door from the inside); however, the handle is not able to reset the safety function. A sensor on the handle portion can be controlled by a bi-stable spring function (e.g., with a handle in the reset position so that a lock bolt provided with a sensor is spring-biased out towards a sensor mounted in or on the door frame and with a handle in a not reset position, the bolt with the sensor being spring-biased in opposite direction.

Figure 1:
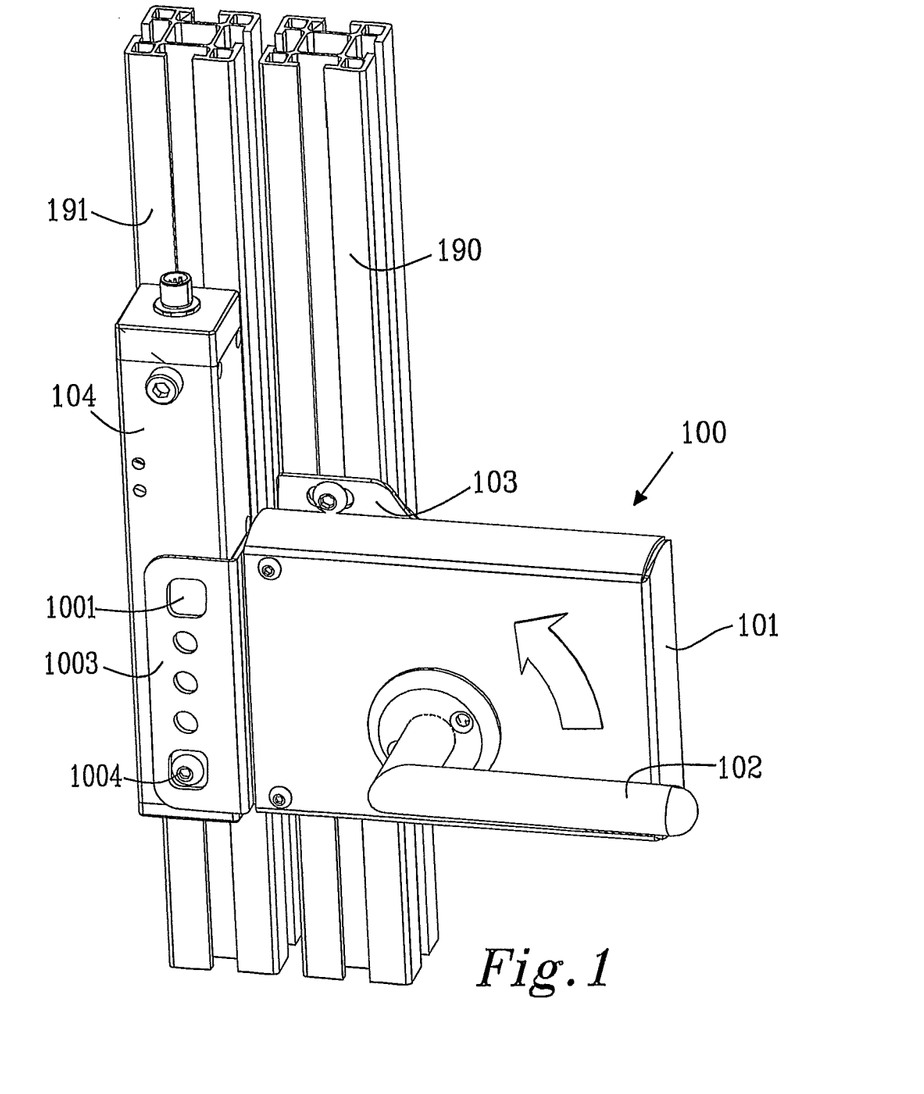
FIG. 1 illustrates a frontal view in perspective of an exemplary lock device and receiver according to the present disclosure mounted on a frame.

An exemplary lock device will now be described in more detail:

FIG. 1 illustrates the lock device 100 in a perspective frontal view. The lock device includes a housing 101, containing a lock housing, handle 102 and attachment means 103. The attachment means 103 are used to attach the lock device 100 at, for example, a frame 190. The lock device 100 further comprises a receiver 104, which may be attached to an opposite frame 191.

The lock housing further comprises an extension 1001 or a lip provided with one or more holes 1003. These holes 1003 may be used together with a means arranged on the receiver (e.g., a screw head 1004), to position the lock housing/device so that locking and closing can be done in a correct way.

Figure 2:
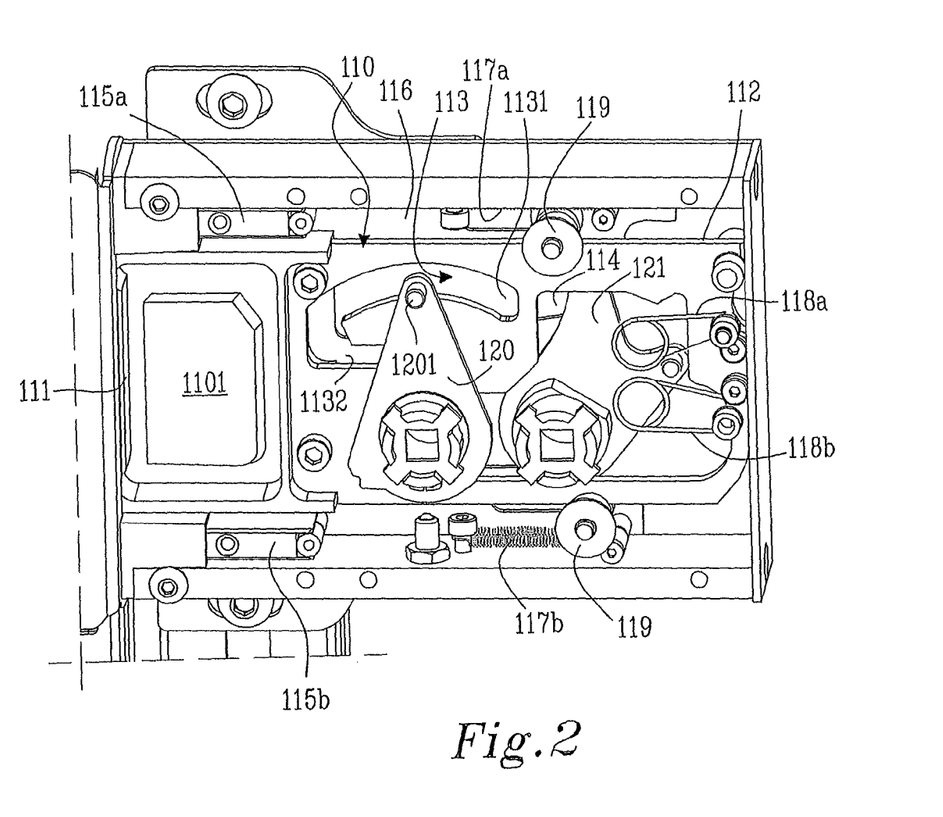
FIG. 2 illustrates an exemplary lock device according to the present disclosure with a cover removed.

FIG. 2 illustrates the lock housing with the cover of the housing removed. The lock housing houses a bolt 110, which according to this example is essentially rectangular. The lock bolt comprises a front portion 111, and a rear portion 112, comprising a first groove 113, and a second groove 114.

The front portion 111 of the lock bolt is arranged to be conveyed into the receiver 104. The first groove 113 is partly formed as an arc 1131 with a terminal end 1132 running essentially parallel to and below the arc 1131. The lock bolt is arranged to be displaced over two sliding pins (or similar) 119. The front portion also comprises a space for receiving a sensor 1101, the function of which will be closer described below. The lock bolt 110 is resiliently attached to the housing by means of bi-stable springs 118a and 118b. The position and design of the grooves may of course vary, however, the function according to the disclosure described below should be provided.

The lock housing, according to this embodiment, comprises moreover two other lock bolts, so called upper and lower latches 115a and 115b, respectively. These bolts are connected to at least one (preferably two) movable base plate 116, spring-biased by means of the springs 117a and 117b. Of course, these latches may be omitted or one or more than two may be used.

A first lever 120 is connected to the handle 102 (FIG. 1) in any known way. The lever guides the lock bolt 110, which will be described in more detail below. The lever 120 comprises a connection portion to the handle in one end around which the lever can rotate and a guiding pin 1201 which is arranged to run in groove 113 and guide the lock bolt 110.

A second lever 121 is connected to a second handle (not illustrated) (e.g., an emergency handle), on the backside of the housing. The second lever guides the lock bolt 110 and the base plate 116 (in turn the bolts 115a and 115b), which will be described in more detail below. The lever 121 comprises a connection portion to the handle in one end around which the lever can rotate and a first guiding pin 1211 (FIG. 7) which runs in groove 114 to guide the bolt 110 and a second guiding pin 1212 (FIG. 7) guiding the base plate 116.

Of course, the second handle (the emergency handle) may be omitted. Even if the lock bolt 120 is illustrated and described in two parts, it will be apparent to those skilled in the art that the bolt may be in one part.

Figure 3:
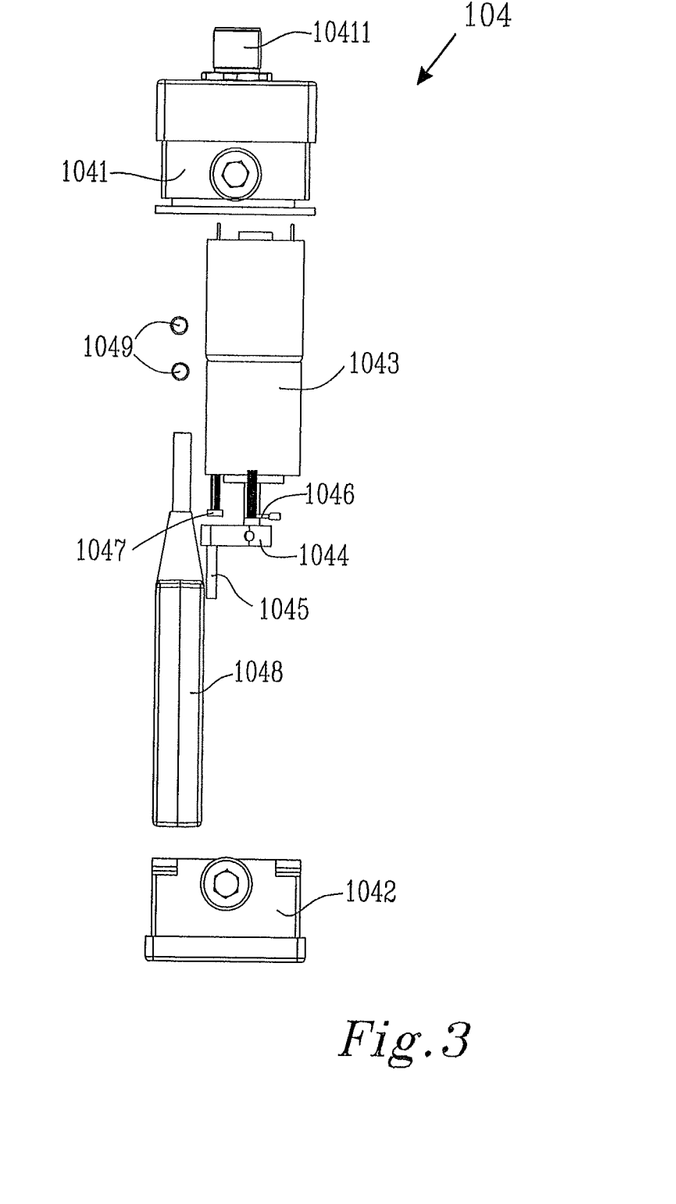
FIG. 3 illustrates an exemplary receiver according to the present disclosure with a cover removed.

FIG. 3 illustrates the receiver 104 inside its cover from the side. The receiver 104 comprises two attachment blocks 1041 and 1042, drive motor 1043, lever 1044, lever pins 1045, sensors 1046 and 1047, position sensor 1048 as well as indicators 1049.

The upper attachment block 1041 comprises an opening 1041, through which electrical cables to the electronics within the receiver may be conducted. The indicators 1049 (e.g., in the form of light-emitting diodes) indicate the locking functions (e.g., red=closed and green=open).

The motor 1043 is arranged to drive the lever 1044 which by means of the lever pins 1045 can drive the lock bolt 110. The sensors 1046 and 1047 give the position of the lever.

The position sensor 1048 cooperates with the sensor 1101 and determines the position of the lock bolt 110 at the receiver.

Figure 4:
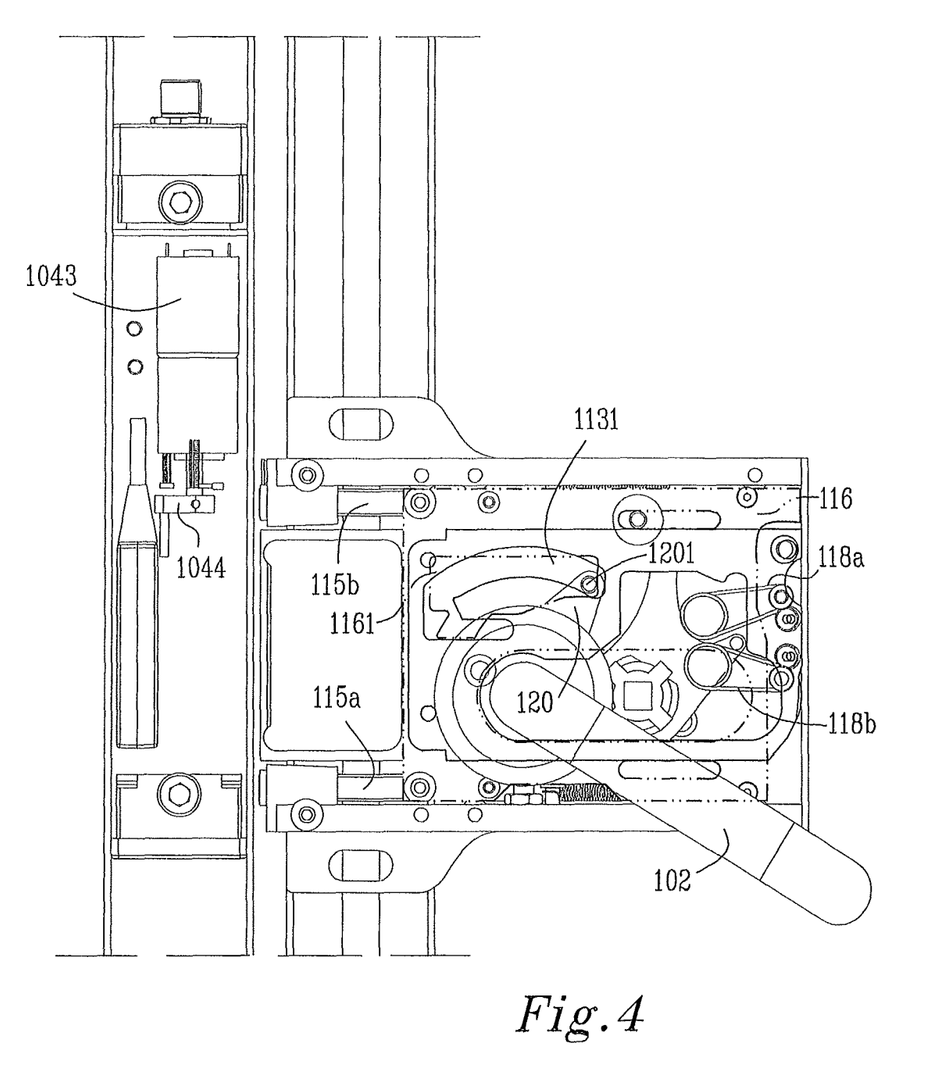
FIG. 4 illustrates an exemplary lock device according to the present disclosure in an open position.

In the following the different positions of the lock device will be described. FIG. 4 illustrates a first position where, for example, the door is open from the outside by the handle 102 being pressed down. The lever 120 is turned so that the guiding pin 1201 is located 5 essentially in the outermost end of the arc-shaped groove 113. In this position the latches 115a and 15b are kept in place by the lever 120 while the lock bolt 110 is retained by the bi-stable springs 118a and 118b.

In the receiver the lever 1044 is turned from the receiver opening by means of the motor 1043.

Figure 5:
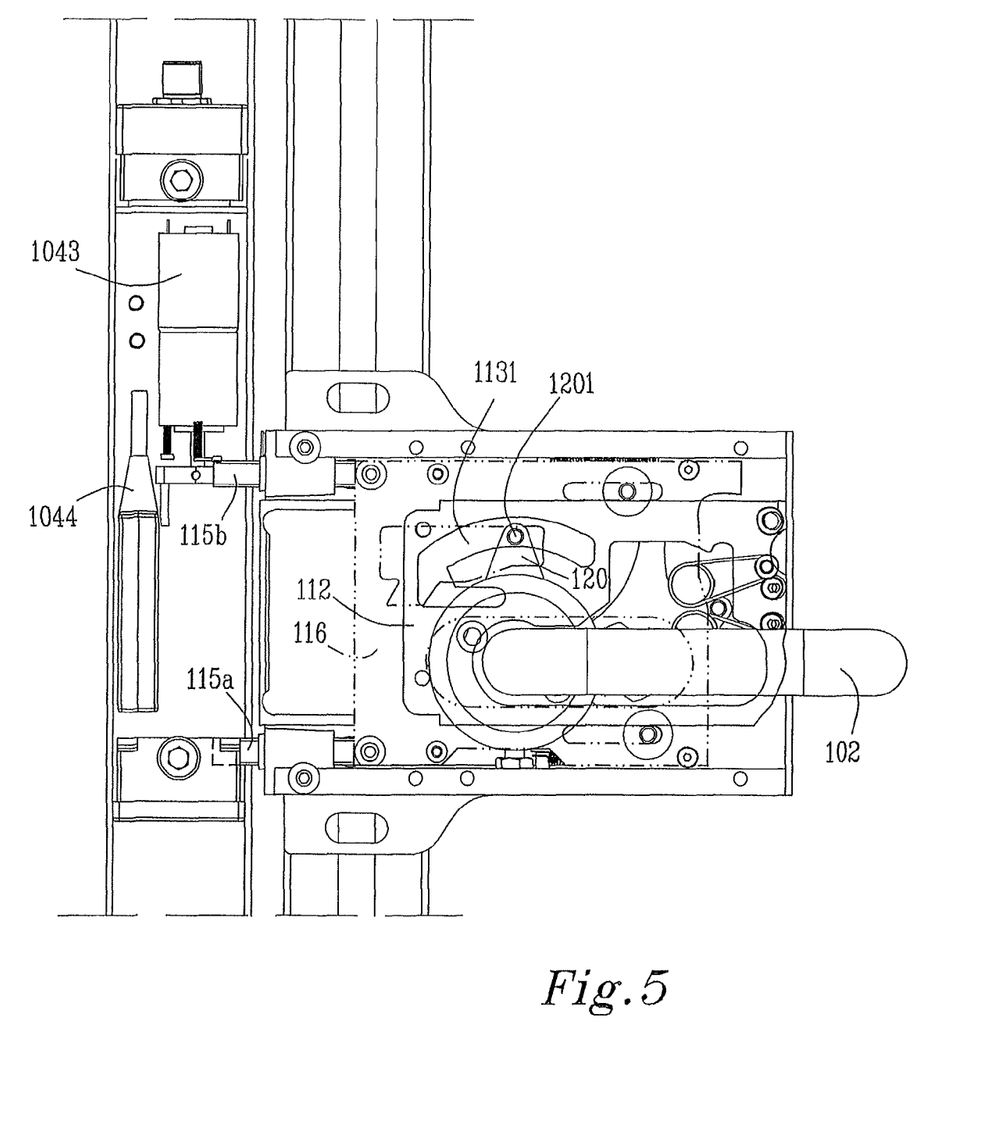
FIG. 5 illustrates an exemplary lock device according to the present disclosure in a closed position.

FIG. 5 illustrates a second position, in which the door is closed but not locked. In this position the latches 115a and 115b are pushed outwards. The lever 120 is positioned in the centre of the arc-shaped groove 113. This occurs by, for example, the door being closed, whereupon the latches are pushed into the receiver. In this position the inner handle, which, for example, is an emergency handle, cannot lock. A locking may imply that if a machine located in a monitored area inside the door comprising the lock device cannot receive an emergency stop resetting, so that the machine can be started again. The function is dependent on that the position sensor 1048 cannot sense the sensor 1101 of the bolt 110. When the bolts 115a and 115b are in this central position, the lock bolt 110 may be brought out by means of the handle 102.

In this position the bolts 115a and 115b are kept in place by the lever 120, while the lock bolt 110 is retained by the bi-stable springs 118a and 118b.

In an exemplary embodiment, the bolts may be provided with sensors which e.g. may identify them and the lock device. These can be of a passive type (e.g., so called RFID (Radio Frequency ID)).

Figure 6:
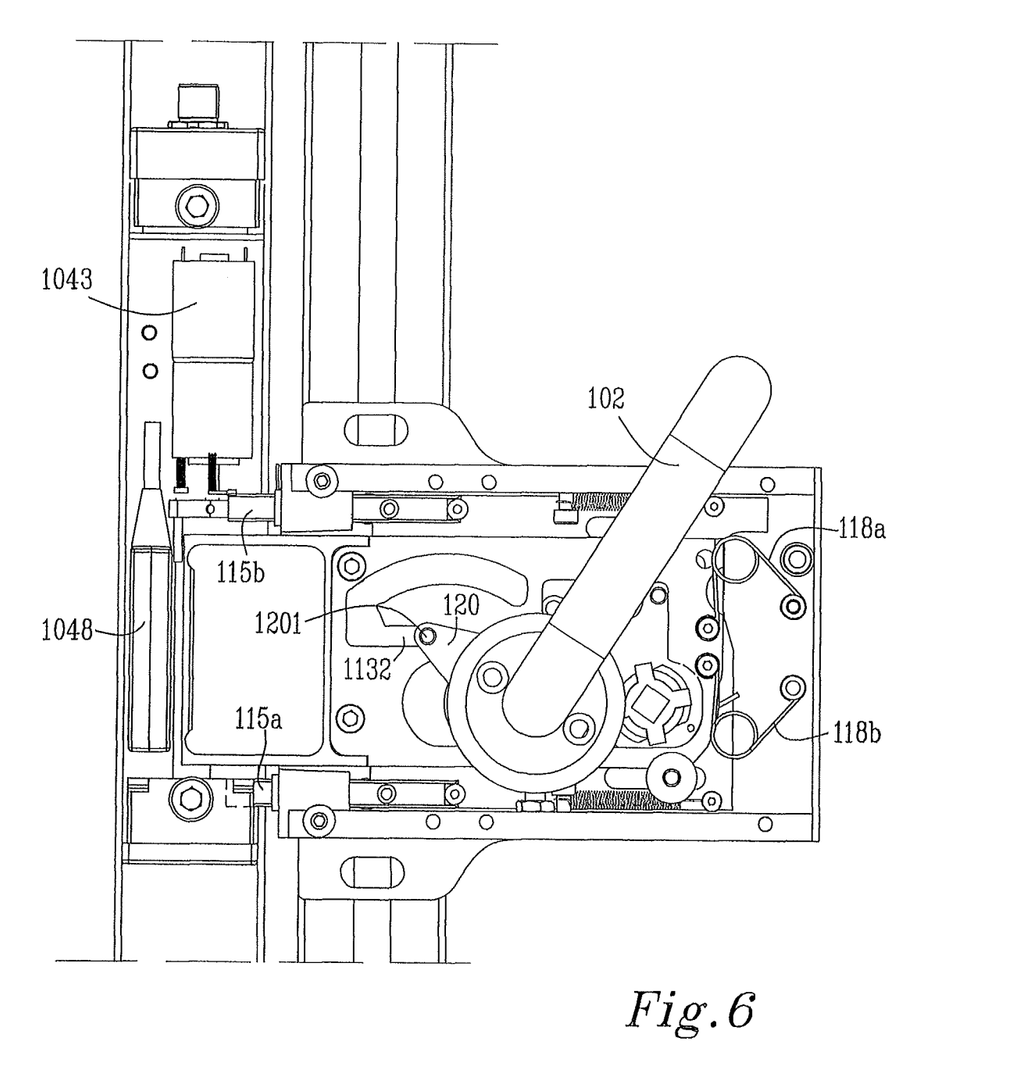
FIG. 6 illustrates an exemplary lock device according to the present disclosure in a locked position.

FIG. 6 illustrates the lock device in a locked position (e.g., the lock bolt 110 and the lock bolts 115a and 115b are pushed into the receiver). The lever 120 is turned (upwards) so that the guiding pin 1201 has passed the edge of the arc-shaped groove and is located in the outermost end of the straight groove 1132. In this position the latches 115a and 115b are kept in place by the lever 120, while the lock bolt 110 is pushed out of the housing by the bi-stable springs 118a and 118b.

In the receiver the lever 1044 is turned from the receiver opening and the bolt 110 is pushed into the receiver. The position sensor 1048 senses the position of the bolt (e.g. by sensing the sensor 1101) and can give clear signal to a possible machine in the closed off area, so that the machine can start.

The position of the handle 102 indicates mechanically that the door is locked. Moreover, the cover may be provided with indicators (e.g., in color) or signs showing the different positions of the lock more apparently.

Figure 7:
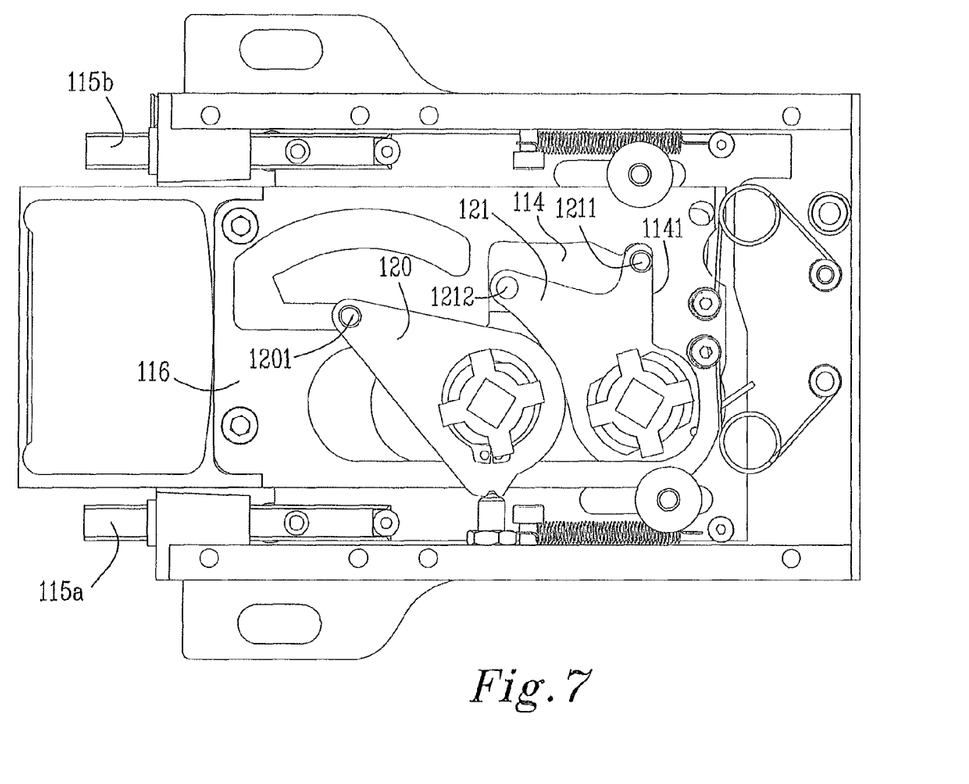
FIG. 7 illustrates an exemplary lock device of FIG. 6 from behind.

FIG. 7 illustrates the locked position from the backside of the lock device. Here the positions of the levers 120 and 121 are illustrated.

Figure 12:
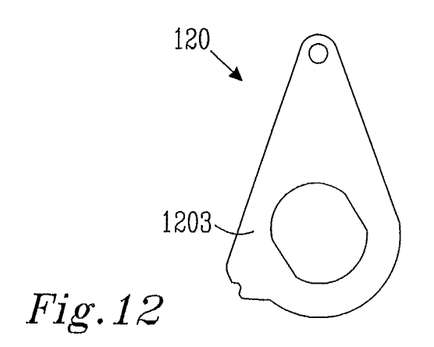
FIG. 12 illustrates a part of an exemplary lock device according to the present disclosure.
Figure 13:
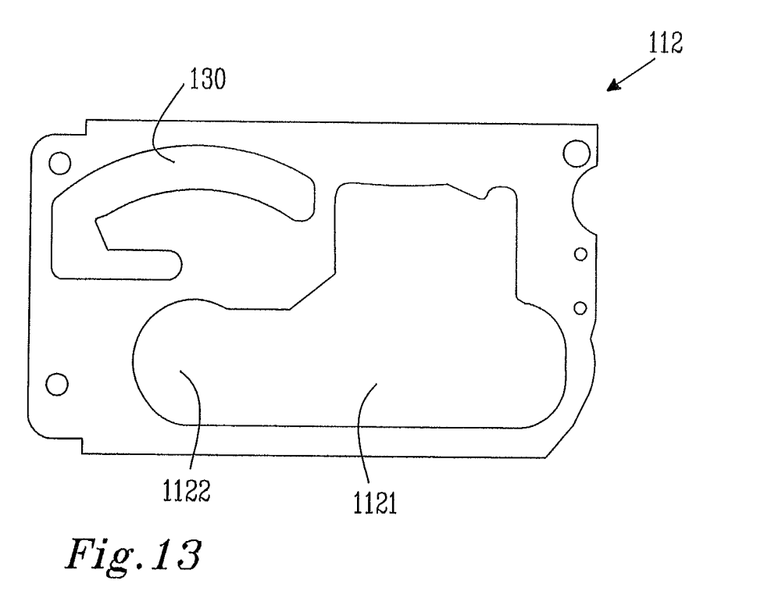
FIG. 13 illustrates a part of an exemplary lock bolt according to the present disclosure.

The movement of the lock bolt from an unlocked position to a locked position is only allowed when the lever 120 with its belonging axis is in its locked position. FIG. 12 illustrates the lever 120 comprising an oval portion 1203 at the axis for the handle 102 (not illustrated) which in the locked position of the bolt is located in, as illustrated in FIG. 13, an enlargement 1122 of the bottom groove 1121 in the rear portion 112 of the lock bolt and that the bolt would turn the axis and release itself is prevented by that the lock bolt has to stand in its completely unlocked position in order to allow pin 1201 to leave the end of the arc-shaped groove 1131. This can be desirable so that the lock bolt will not be able to spring-bias to its locked position at failure of, for example, the bi-stable springs 118a and 118b.

Figure 8:
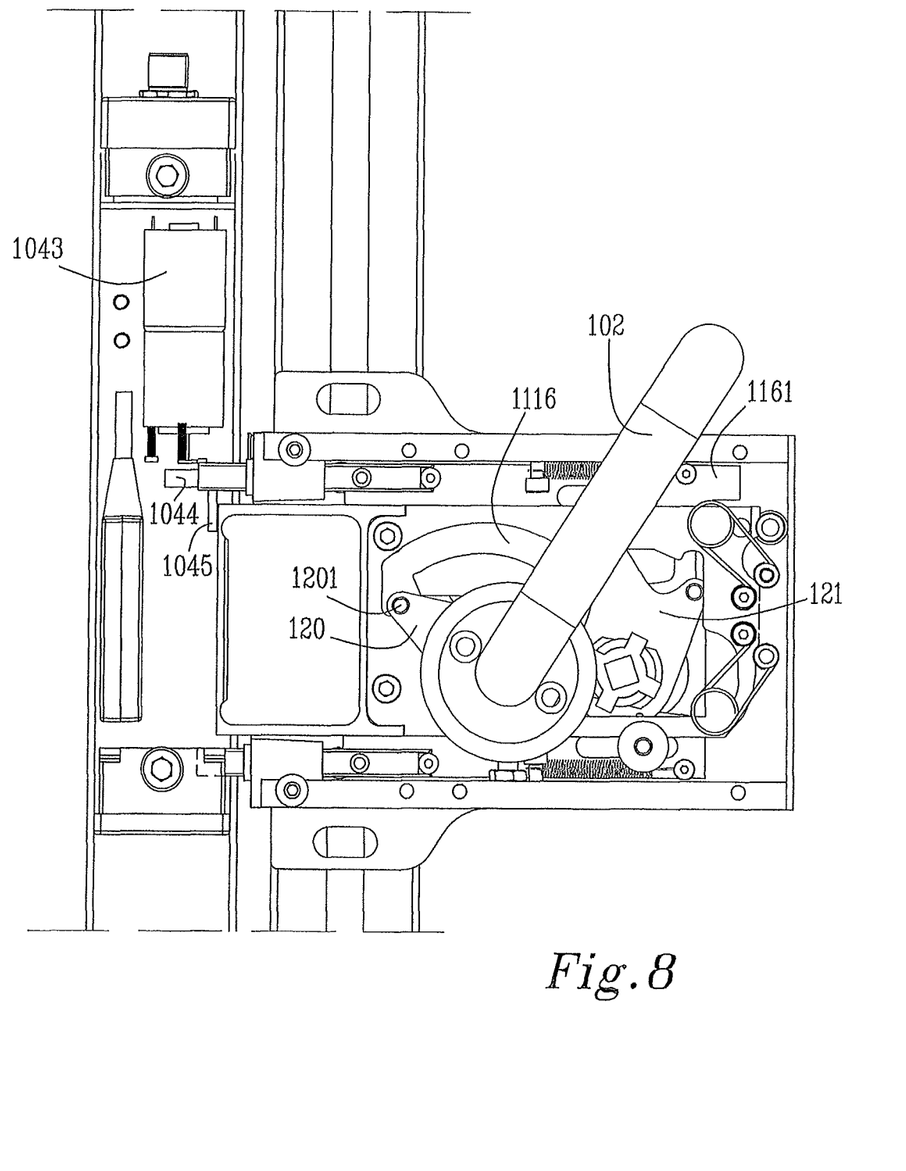
FIG. 8 illustrates an exemplary lock device according to the present disclosure in a reset position.

Just turning of handle 102 cannot unlock the lock device. In an exemplary embodiment, the bolt 110 must be displaced in such a way that the pin 1201 can be moved towards the arc-shaped groove 1131 and be released from the straight groove 1132. This position is illustrated in FIG. 8. This can only occur by pressing the bolt 110 inwards, either according to this example from the front (e.g., out of the receiver), or by means of the emergency handle (not illustrated). In the second case, the emergency handle is influencing the lever 121, so that this by means of the guiding pin 1211 pulls the bolt 110 inwards by means of the edge 1141 of the groove 114.

In FIG. 8 it is further illustrated that the motor 1043 has rotated the lever 1044 towards the front edge of the bolt 110 and by means of the lever pin 1045 pressed the bolt 110 into the unlocked position. Also the positions of levers 121 and 120 are illustrated. The handle 102 is in an upright position. By pressing the handle, it will influence the lever, which will by a radial movement move the guiding pin 1201 in the arc-shaped groove at the same time as the guiding pin 1211 in contact with the rear edge 1141 (FIG. 4) of the groove will force the plate (plates) 116 to be displaced inwards and at the same time displace the latches and open the door. The door may also be opened from the inside by means of the emergency handle influencing lever 121.

The motor 1043 can be controlled by means of a signal from a control unit (not illustrated) which receives a clear signal from the possible machine working within the safety area that the machine has stopped. As long as no clear signal is received the lock device cannot be unlocked (e.g., the bolt 110 can not be pulled out of the receiver from outside, by means of the handle 102. However, the emergency handle can activate the bolt 110 and unlock the lock device. In this case, a signal is received from the position sensor 1048 that the bolt is not in its locked position and the machine can be immediately stopped.

The lock bolt 110 can, for example, only be influenced from its unlocked to locked position by means of the pin 1201 if the latches 115a and 115b are engaged in the receiver. The latches 115a, 115b are locked in an engagement position in the receiver when the lock bolt 110 is in its locked position. This is achieved by a "depression" in the groove 1121 (see FIG. 12) where the pin 1201 can go down to a position in which the lock bolt 110 is allowed to move outwards, under the condition that the latches are in their balanced central position (with control of the protrusion of the bolt from the lock housing) and pin 1201 prevents in this position the latches 115a, 115b from leaving their balanced central position, and the guiding of the position of the receiver and the lock in relation to each other (control of distance together with protrusion facilitates control of engagement) occurs by means of the hole image of that extension from the lock, which overlaps the receiver. This can be important in order to know that the locking is occurring with all the bolts.

Of course, other solutions than the motor may be used for pressing the bolt out of the receiver (e.g., pneumatic solutions). Moreover, a drive unit may be located in the lock housing itself.

Figure 9:
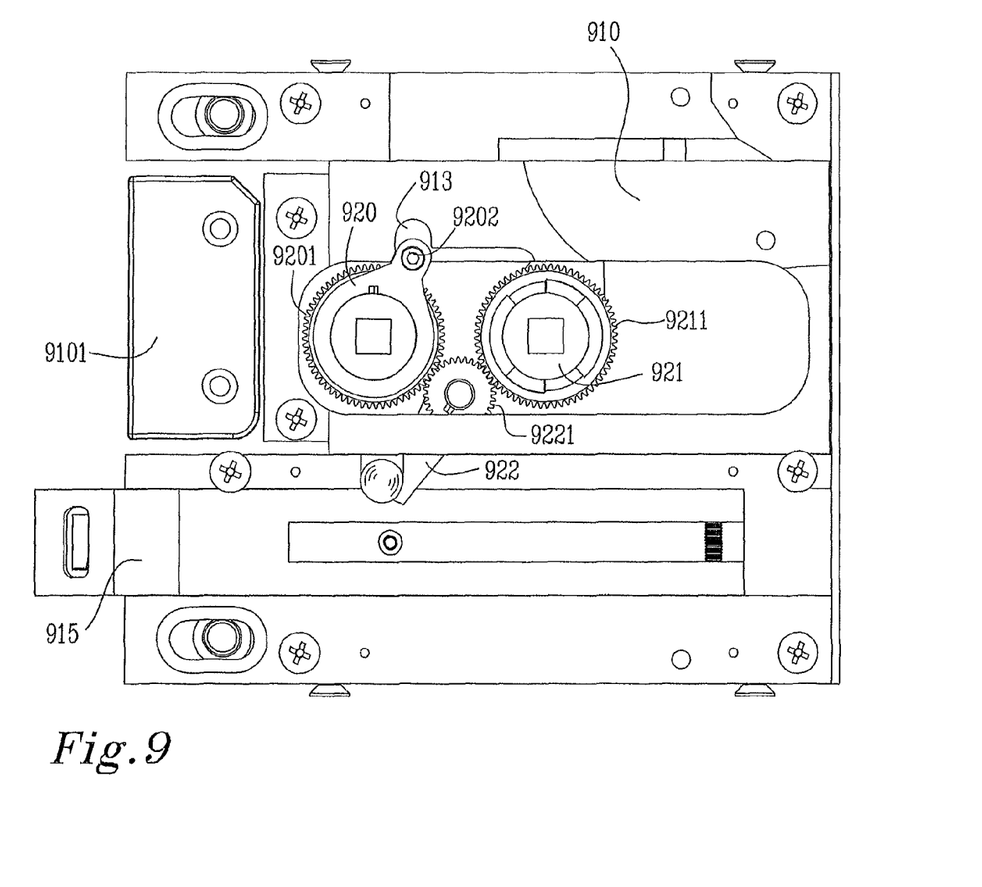
FIG. 9 illustrates a second exemplary embodiment of a lock device according to the present disclosure with a cover removed.
Figure 10:
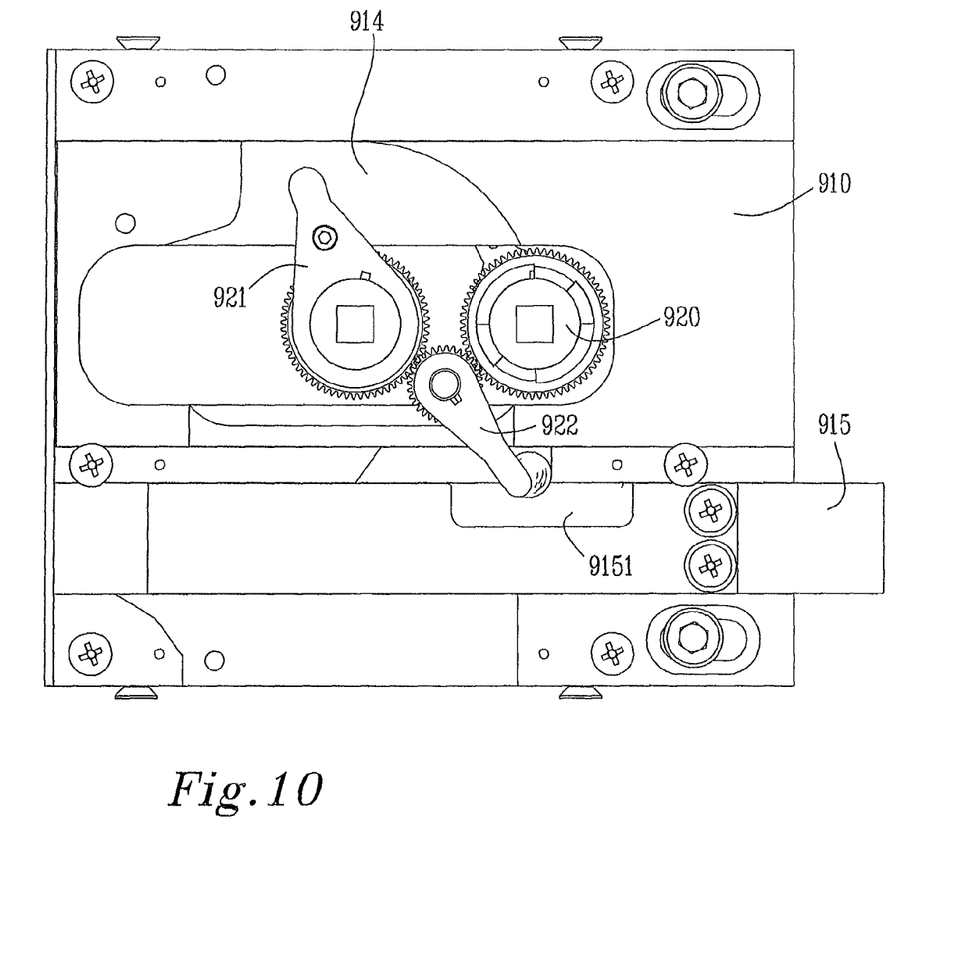
FIG. 10 illustrates the exemplary lock device of FIG. 9 from behind.

FIGS. 9 and 10 illustrate another exemplary embodiment of the lock device 900 according to the disclosure from the front and from behind, respectively. In this embodiment, the groove 113 has been replaced by a groove 913 with another design and the lever 120 with a lever 920 provided with gear wheel 9201. The lever 920 has the same function as the lever 120 and is provided with an opening in order to allow a handle or similar to be introduced in order to actuate it. The lever 920 is further provided with a guiding base 9202 running in the groove 913 and guiding the lock bolt 910. In the same way as the foregoing example, a second lever 921 is arranged to cooperate with a second handle (emergency handle). The lever 921 is provided with a gear track 9211 arranged to cooperate with a second groove 914 on the bolt 910 in order to unlock and/or open.

Also this embodiment is shown to include a latch 915. The latch is guided by a third lever 922, the end of which is provided with a gear track 9221 and cooperates with levers 920 and 921 to displace the latch 915.

At locking, the outer handle (not illustrated) is moved, which influences the lever 920 driving the lock bolt 910 by means of guiding base 9202 in groove 913. This is, for example, only occurring as long as the base is located in the groove. At locking the base is released from the groove and cannot influence the unlocking. At the same time the latch 915 is guided out from the lock housing by the lever 920 influencing the lever 922. For unlocking it can be desirable that the bolt 910 is pressed into the housing according to earlier examples. The emergency handle, in the same way as before, can unlock by the lever driving the lock bolt 910 by means of the groove 914. Opening and closing (not locked position) occurs by the lever 922 actuated by either lever 920 or 921 moves the latch 915 through the groove 9151.

Figure 11:
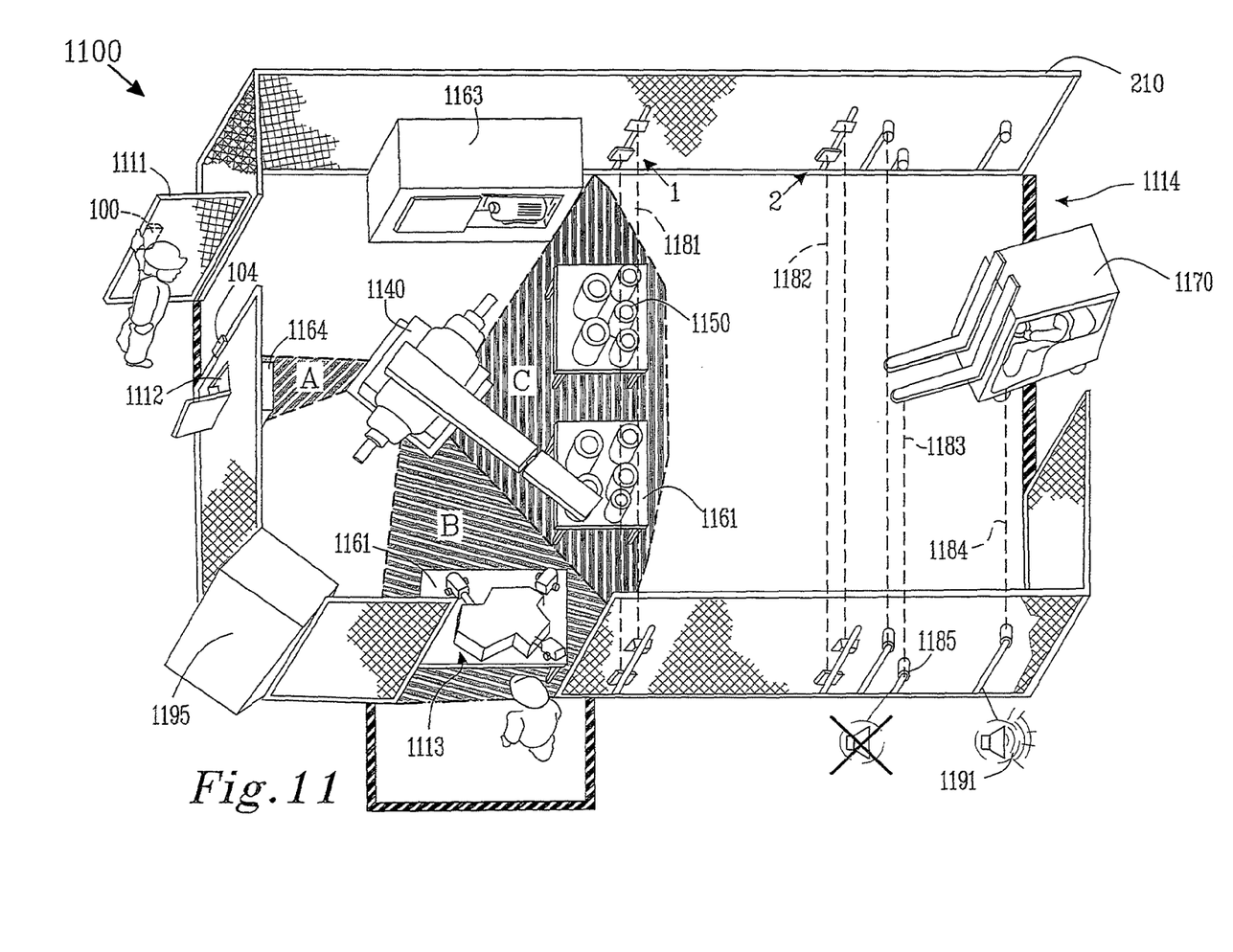
FIG. 11 illustrates schematically an exemplary application of the lock device according to the present disclosure.

FIG. 11 illustrates a schematic robot installation in an area provided with gates. The working area is delimited by protection gates 1110. Through openings in the gates, there is a possibility of accessing different sections within the area (e.g., an interlocked gate 1111, a measurement opening 1112, a gate 1113 and a truck gate 1114). The installation is built up according to:

A robot 1140 handles details 1150 between pallet 1161, lathe 1162, multi-operational machine 1163, test station 1164 and a scrap crate 1195. The working area of the robot is divided into sections, which, for example, makes e.g. checking if the robot is located in certain areas (e.g., B or C), possible.

At the test station those details that should be inspection measured are ordered. In this case manually through the opening 1112. The opening is provided with a position switch which gives the robot stop if it is located in sector A. The position and the movement speed of the robot are determined by means of sensors as described above.

The interlocked gate 1111 and the inspection opening 1112 may be provided with lock devices according to the present disclosure. In the case with the gate, the lock device 100 is located on the gate 1111 itself and the receiver 104 at the protection gate 1110. When the interlocked gate 1111 is opened from the inside by means of the emergency handle the bolt is removed from the sensor 1048 in the receiver, which gives a stop signal and the robot stops wherever it is located. The gate cannot be opened from the outside when the robot is at work. If the robot stops, the motor 1043 receives a signal and drives the bolt out of the receiver whereupon the handle 102 can open the gate.

At the measurement station, the details are taken out of the opening 1112, which is provided with a position switch, which gives the robot stop if it is located in position A. The position of the robot is sensed by a sensor (e.g., mounted in the large rotation axis).

Where the truck 1170 is entering for pallet handling there are light beams 1181-1184. When the inner light beam (1) is influenced, the robot is stopped wherever it is located, if the outer light beam first has been influenced.

When the outer light beam (2) is influenced, the robot is stopped if it is located in sector C. In other case, the information is given to the robot that somebody is in sector C (e.g., area delimitation). If the light beam is influenced, it must be reset outside the fence.

Outside light beam 2, there are three photo cells. The outer is connected to a sound signal 1191 giving an entrance warning. The inner photo cell is there to give the robot production stop before stop is given from light beam 2. Production stop gives a smoother slow down.

A third photo cell 1185, provided for detecting the forks of the truck, may shut the sound signal off. On a control box 1195 comprising the monitoring unit according to the disclosure, it is displayed which stops have occurred and the reasons for the stops.

The lock device according to the disclosure may be used in all applications requiring a safe closing and locking. For example the device may be a part of an alarm system and the lock may be mounted on doors and windows.

The invention is not limited to the illustrated described embodiments. Variations and designs may occur depending on needs and requirements.

Thus, it will be appreciated by those skilled in the art that the present invention can be embodied in other specific forms without departing from the spirit or essential characteristics thereof. The presently disclosed embodiments are therefore considered in all respects to be illustrative and not restricted.

The scope of the invention is indicated by the appended claims rather than the foregoing description and all changes that come within the meaning and range and equivalence thereof are intended to be embraced therein.

What is claimed is:

1. A lock device comprising:
   a displaceable lock bolt configured to provide an unlocked position, a locked position and a reset position; and
   a receiver comprising an element configured to receive the lock bolt to provide the locked position and a drive unit for displacing the lock bolt to the unlocked position, wherein the lock bolt includes:
      a guide portion for guiding said lock bolt from the unlocked position to the locked position; and
      a guiding means for applying a force to the lock bolt, to place said lock bolt in the locked position, the guiding means comprising an actuation portion displaceable in said guide portion,
   wherein when the lock bolt is in the locked position said actuation portion being prevented from displacing in said guide portion and displacing the lock bolt to the unlocked position, the lock bolt being displaceable from the locked position to the unlocked position when an external force is applied to a first portion of the lock bolt by said drive unit for displacing the lock bolt.

2. Lock device according to claim 1, wherein the first portion of the lock bolt is provided for locking the lock bolt, and the guide portion is a guiding groove included in a second portion of the lock bolt portion for guiding the lock bolt, which guiding groove comprises:
   a first groove portion for receiving said guiding means to be moved freely for displacing said lock bolt, and a second groove portion for fixing said guiding means to prevent the lock bolt from being displaced.

3. Lock device according to claim 1, comprising:
   a guiding unit arranged to displace said lock bolt, and remove said guiding means from a locked position by which the guiding means is essentially freely moveable.

4. Lock device according to claim 1, comprising:
   a housing; and
   a first handle.

5. Lock device according to claim 2, wherein said second lock bolt portion comprises:
   said guiding groove and a second guiding groove.

6. Lock device according to claim 2, wherein said first groove portion is essentially formed as an arc, and said second groove portion runs essentially parallel to said first groove portion.

7. Lock device according to claim 1, comprising:
   a sensor.

8. Lock device according to claim 4, comprising:
   a bi-stable spring resiliently attached between the lock bolt and the housing.

9. Lock device according to claim 4, comprising:
   at least a second lock bolt.

10. Lock device according to claim 9, wherein said second lock bolt is connected to a movable part.

11. Lock device according to claim 10, comprising:
    a first lever connectable to the first handle and comprising said guiding means.

12. Lock device according to claim 11, comprising:
    a second lever connectable to a second handle at an opposite side of the first handle.

13. Lock device according to claim 12, wherein the second lever guides said lock bolt and the movable part.

14. Lock device according to claim 11, wherein the first lever comprises:

a connection part to the first handle in one end around which the first lever is rotatable; and a first guiding pin running in said guiding groove to influence the lock bolt and a second guiding pin for guiding said movable part.

15. Lock device according to claim 1, wherein the receiver comprises:

a guiding part; and a sensor.

16. Lock device according to claim 15, wherein the drive unit is motor for driving said guiding part and for driving the lock bolt.

17. Lock device according to claim 15, wherein the sensor is arranged to sense and provide a signal regarding a position of the lock bolt.

18. Lock device according to claim 17, wherein said sensor is connected to a control unit, said control unit receiving the signal for steering other lock units.

19. Lock device according to claim 1, wherein said guiding means is a gear wheel.

20. Lock device according to claim 1, wherein said guiding means is a motor.

21. Lock device according to claim 4, wherein the housing comprises:

means for correctly positioning the housing.

22. Lock device according to claim 21, wherein said means for correctly positioning is an extension provided with at least one hole to cooperate with the receiver.

23. Lock device according to claim 13, comprising:

a drive unit for driving movement of said lock bolt from the unlocked position to the locked position when the first lever is in a locked position, wherein said first lever comprises:

an oval portion, which in the locked position of the lock bolt is located in an enlargement of the guiding groove in the lock bolt.

24. Lock device according to claim 23, wherein the lock bolt in a completely unlocked position is configured to allow a guiding pin to leave said guiding groove and prevent turning of the first lever about its axis, and release of the lock bolt.

25. Lock device according to claim 13, wherein the lock bolt is movable from an unlocked position to a locked position when said second bolt is in a balanced central position.

26. Lock device according to claim 25, wherein said second lock bolt is locked in a central position, the receiver and the position of the lock bolt being guided towards each other to make a guaranteed engagement in the receiver, when the lock bolt is in its locked position.

27. Lock device according to claim 26, wherein the lock bolt is displaceable from the unlocked position to the locked position by a guiding pin when the lock bolt is engaged in the receiver via a depression in a guiding groove engaged by the guiding pin, the lock bolt being pushed out when said second lock bolt is in a balanced central position and guiding of positions of the receiver and the lock bolt in relation to each other occurs by at least one hole in an extension from the lock bolt which overlaps the receiver.

28. An enclosed safety area containing a machine, the safety area provided with a delimitation, which delimitation comprises:

an openable part;

a lock device for locking the openable part, the lock device including:

a displaceable lock bolt having an unlocked position, a locked position and a reset position; and a receiver configured to receive and displace the lock bolt to provide the locked and unlocked positions, wherein the lock bolt includes:

a guide portion for guiding said lock bolt from an unlocked position to a locked position; and a guiding means including an actuation portion displaceable in said guide portion and configured to apply a force to the lock bolt to place said lock bolt in the locked position; and means for preventing said guiding means from displacing the lock bolt to the unlocked position, the lock bolt being configured to displace from the locked position to the unlocked position when an external force is applied to a first lock bolt portion by the receiver, wherein the receiver is arranged on the delimitation, and said lock device is arranged to keep the openable part locked during operation of the machine which is arranged to stop upon opening of said openable part from inside the enclosed safety area.

* * * * *